United States Patent [19]

Sneddon

[11] Patent Number: 5,518,433
[45] Date of Patent: May 21, 1996

[54] TOY JEWEL ORNAMENT WITH THERMALLY RESPONSIVE COVER

[75] Inventor: John Sneddon, Santa Monica, Calif.

[73] Assignee: Mattel, Inc., El Segundo, Calif.

[21] Appl. No.: 383,134

[22] Filed: Feb. 2, 1995

[51] Int. Cl.$^6$ .......................... A63H 33/00; A63H 33/16
[52] U.S. Cl. ................................................ 446/14; 446/79
[58] Field of Search ........................ 446/14, 26, 27,
446/71, 72, 73, 76, 79, 80, 81, 140, 308,
309, 310, 311, 268, 475, 486, 487; 434/283,
276, 300

[56] References Cited

U.S. PATENT DOCUMENTS

| | | |
|---|---|---|
| 2,561,217 | 7/1951 | Muir . |
| 3,471,964 | 10/1969 | Cherry et al. ........................ 446/268 |
| 3,495,348 | 2/1970 | Mitchell ............................... 446/310 |
| 3,576,085 | 4/1971 | Nelson . |
| 3,686,894 | 8/1972 | Handler et al. ..................... 446/27 X |
| 3,955,312 | 5/1976 | Pugh . |
| 4,056,895 | 11/1977 | Terrulli .................................. 446/475 |
| 4,109,851 | 8/1978 | Goates . |
| 4,169,336 | 10/1979 | Kuhn . |
| 4,236,347 | 12/1980 | Fauls . |
| 4,244,140 | 1/1981 | Kim . |
| 4,505,687 | 3/1985 | Munro . |
| 4,881,915 | 11/1989 | Liaw . |
| 4,944,363 | 7/1990 | Osher et al. . |
| 4,952,190 | 8/1990 | Tarnoff et al. . |
| 5,006,089 | 4/1991 | Lee . |
| 5,026,054 | 6/1991 | Osher et al. . |
| 5,084,997 | 2/1992 | DiPaola . |
| 5,090,569 | 2/1992 | Nissen et al. ...................... 446/310 X |
| 5,189,110 | 2/1993 | Ikematu et al. . |
| 5,234,370 | 8/1993 | Shapero et al. . |
| 5,310,375 | 5/1994 | Kanauchi ............................... 446/71 |
| 5,310,376 | 5/1994 | Shannon ............................. 446/80 X |

FOREIGN PATENT DOCUMENTS

563238153 A 10/1988 Japan .
1389801 A 4/1988 U.S.S.R. .

Primary Examiner—Mickey Yu
Assistant Examiner—D. Neal Muir
Attorney, Agent, or Firm—Roy A. Ekstrand

[57] ABSTRACT

A toy jewel ornament includes a body having one or more articulated elements which are hingedly movable upon the body to assume a closed position covering a toy jewel also supported upon the body or an open position exposing the toy jewel. In one embodiment, the ornament is configured as a pendent and resembles an Aladdin's lamp having a jewel at its center and a generally hemispherical hollow jewel cover coupled to the pendent body by an integrally molded hinge. In an alternate embodiment, the ornament is formed in a flower-like shape having a plurality of radially extending petals and is securable to the wrist of a toy figure. The petals are movable between an open bloomed position exposing the jewel and a closed bud-like position fully enclosing the jewel. The ornaments are thermally set in the closed position by manually forcing the ornament to the closed position after warming and temporarily immersing the ornament in a cold water bath. Thereafter, the ornament maintains the thermal set and maintains the closed position until again exposed to a warm water bath or its equivalent at which time the ornament again opens exposing the jewel.

9 Claims, 2 Drawing Sheets

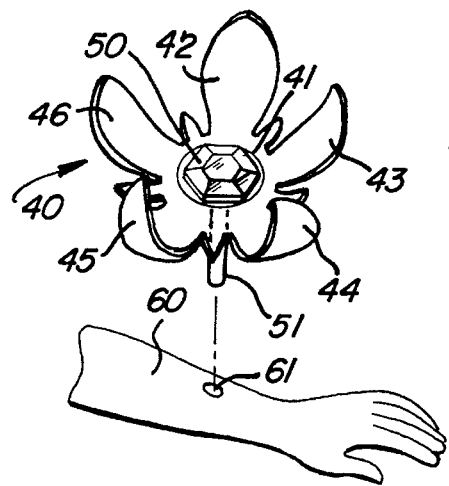
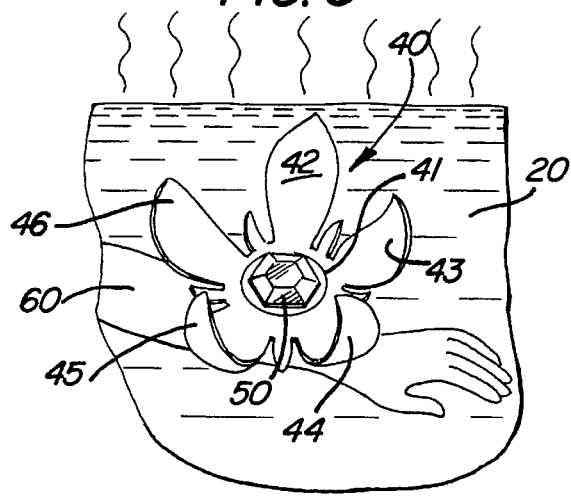
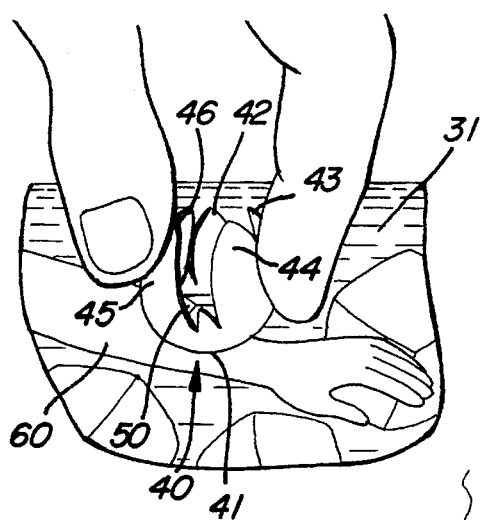
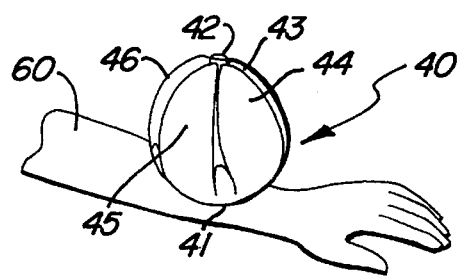
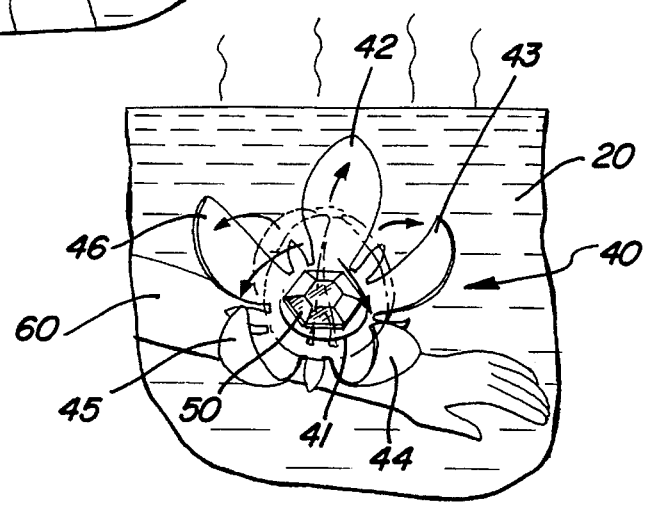

TOY JEWEL ORNAMENT WITH THERMALLY RESPONSIVE COVER

FIELD OF THE INVENTION

This invention relates generally to ornamental accessories used with toy figures and particularly to thermally responsive ornaments.

BACKGROUND OF THE INVENTION

Practitioners in the toy art have often used accessories of various types to enhance the play value of the toy figures which they produce. While practitioners have provided a great variety of such accessories and associated toys for use with toy figures, many of the more interesting toy accessories use various stretching and shape memory properties of plastics or similar materials. Some of such plastic or stretchable materials exhibits a so-called "posable" property characterized by the ability to retain a particular shape once the object is formed or distorted. Others using so-called shape memory employ a property in which the object tends to reassume a predetermined shape despite substantial distortion, stretching or other manipulation. The properties of posability and shape memory have, in some instances, been sufficiently interesting to toy manufacturers to result in the creation of novelty and toy products which are utilized in a stand-alone type product not necessarily associated with a toy figure or the like. In either event, the properties of posability or shape memory continue to provide interesting toy products and accessories for use with toy figures.

For example, U.S. Pat. No. 5,234,370 issued to Shapero, et al. sets forth a POSABLE DOLL HAIR AND METHOD OF MANUFACTURE FOR THE SAME in which a doll supports a quantity of rooted hair fabricated to provide a posable or cold setting characteristic. The posable hair is formed of an amorphous thermoplastic material preferably having a high molecular weight in a compound including plasticizers, heat stabilizers and lubricants.

U.S. Pat. No. 4,505,687 issued to Munro sets forth a FORM RETAINING STUFFED FIGURINE comprising a body portion and head portion connected thereto. The body comprises a tubular outer covering, a film material substantially filling the tubular outer covering and a piece of elastic extending along at least a part of the tubular outer covering.

U.S. Pat. No. 4,952,190 issued to Tarnoff, et al. sets forth a DEFORMABLE ARTICLE including a flexible bladder formable in any desired shape having a sealable filling stem for receiving a moldable filling medium such as a cohesive mixture of hollow or solid microspheres and water.

U.S. Pat. No. 3,955,312 issued to Pugh sets forth a GRIPPING HAND FOR DOLLS capable of gripping or holding an object therein without the need of any mechanical components. The hand is formed of a flexible plastic material which imparts prehensile characteristics to the hand and fingers.

Russian Patent SU1389801 sets forth a MOVING TOY having limb to body connecting hinges made from two sleeves rotated by thermal memory material plate. The sleeves can rotate relative to each other by means of a hinged plate made from thermal memory material connected by a spiral heating element to a battery. When the heating elements are energized, the thermal memory hinge undergoes movement.

Japanese Patent 63-238153 sets forth a DELAYED SHAPE RECOVERABLE ELASTOMER RESIN COMPOSITION FOR DOLLS which utilizes polynorbornene and styrene-diene elastomer added with phenol-based antioxidant.

U.S. Pat. No. 4,169,336 issued to Kuhn sets forth a STRETCHABLE FIGURE EXHIBITING SLOW RECOVERY having a skin of elastic film and a filling of a high viscosity material. The skin may be formed of a natural or synthetic rubber capable of recovery after stretching three hundred percent of its original dimensions.

U.S. Pat. No. 4,236,347 issued to Fauls sets forth a FLEXIBLE DOLL CLOSURE AND HEAD MOUNTING having a form defined by a moldable elastic skin and a viscous liquid filler and a separately molded head. A cylindrical member having a large diameter filling passage and external flanges spaced about its length provides closure means and head mounting to the figure.

U.S. Pat. No. 4,244,140 issued to Kim sets forth TOYS WITH SHAPE MEMORY ALLOYS which recover their original shapes after deformation when they are heated by electrical or thermal stimulus. The deformation and shape recovery action may be repeated.

U.S. Pat. No. 2,561,217 issued to Muir sets forth a SIMULATED FLOWER WITH THERMOSTATIC ACTION having a flower-like housing defining a plurality of petals formed of a metallic foil and nonmetallic layer which surround a conventional lightbulb. The heat from the lightbulb when illuminated causes bending of the petals and opening of the flower.

U.S. Pat. No. 4,109,851 to Goates sets forth a NOVELTY POSTCARD AND METHOD in which a thermocontractive plastic plate is initially adhered to a backing sheet in the form of a postcard. The thermocontractive plastic plate is painted or marked with designs, drawings or other indicia. When the card has reached its destination, it may be heated in an oven whereupon the thermocontractive plastic plate softens and shrinks to form a miniature size novelty item.

U.S. Pat. No. 5,189,110 issued to Ikematu, et al. sets forth a SHAPE MEMORY POLYMER RESIN COMPOSITION AND THE SHAPE MEMORIZING MOLDED PRODUCT THEREOF formed of a block copolymer having an A-B-A block structure in the polymer chain and having a weight average molecular weight within the range of ten thousand to one million.

U.S. Pat. Nos. 4,944,363 and 5,026,054 both issued to Osher, et al. set forth a resiliently deformable toy ball which is soft and supple and which provides an intriguing relaxing feeling when squeezed. The ball possesses a low rebound percentage due to its resiliently deformable nature.

U.S. Pat. No. 5,006,089 issued to Lee sets forth a LIFE-LIKE TOY ANIMAL having a stuffed animal supporting a closed fluid containing liner filled with a viscous silicon or silicon water material. The weight of the silicon water material gives the animal a life-like weight. The liner is covered by a fur-like plush.

U.S. Pat. No. 4,881,915 issued to Liaw sets forth a DINOSAUR EGG having a translucent eggshell including a series of crack lines which form weakened fault lines on the eggshell surface. A compressed sponge dinosaur is located within the eggshell and is releasable when the egg is immersed in warm water.

U.S. Pat. No. 3,576,085 issued to Nelson sets forth a PACKAGE TOY having a toy holding package which itself serves as a plaything comprising a structure with a central depression for holding a toyset and surrounding walls that have the appearance of human or animal bodies.

U.S. Pat. No. 5,084,997 issued to DiPaola sets forth a FISHING LURE AND METHOD. The fishing lure includes a flexible body having means for attaching a hook to one end and a fishing line to the other end. The body portion is formed of a flexible core element with radially extending flexible fibers.

While the foregoing described prior art devices have provided improvement in the art and in some instances have enjoyed commercial success, there remains nonetheless a continuing need in the art for evermore improved and interesting toys and toy products.

SUMMARY OF THE INVENTION

Accordingly, it is a general object of the present invention to provide an improved toy jewel ornament. It is a more particular object of the present invention to provide an improved toy jewel ornament for use in combination within a toy figure. It is a still more particular object of the present invention to provide an improved toy jewel ornament with a thermally responsive cover which may be used in association with a toy figure.

In accordance with the present invention, there is provided a jewel ornament toy comprising: an ornament body formed of a shape-memory material defining an open position and a closed position; and a toy jewel supported upon the ornament body, the jewel being exposed in the open position of the ornament body and hidden in the closed position of the ornament body, the ornament body assuming the open position when warmed and being reconfigurable to the closed position when forced to the closed position and cooled to acquire a thermal set and the body returning to the open position thereafter when warmed.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 7 sets forth a perspective assembly view of an alternate embodiment of the present invention toy jewel ornament in the open position;

FIG. 8 sets forth a perspective view of the present invention toy jewel ornament being warmed in a warm water bath;

FIG. 9 sets forth a perspective view of the present invention toy jewel ornament being configured in the closed position;

FIG. 10 sets forth a perspective view of the present invention toy jewel ornament in the closed configuration; and FIG. 11 sets forth a perspective view of the present invention toy jewel ornament in response to being immersed in a warm water bath.

DESCRIPTION OF THE PREFERRED EMBODIMENTS

Figure 1:
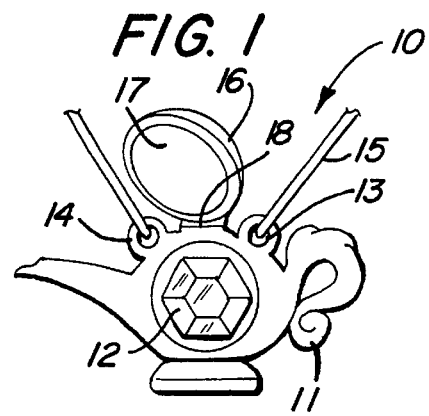
FIG. 1 sets forth a front view of a toy jewel ornament constructed in accordance with the present invention.

FIG. 1 sets forth a front view of a toy jewel ornament constructed in accordance with the present invention and generally referenced by numeral 10. Ornament 10 is configured to provide a pendent to be worn upon a toy figure. Accordingly, ornament 10 includes a pendent body 11 formed in a fanciful depiction of an Aladdin's lamp and having a pair of eyelets 13 and 14. A flexible cord 15 is received within eyelets 13 and 14 to provide for convenient wearing of ornament 10 in a pendent-like fashion. Pendent body 11 further includes a generally hemispherical jewel cover 16 defining an interior cavity 17 which is coupled to pendent body 11 by a hinge 18. A toy jewel 12 simulating a faceted stone such as a diamond, ruby, emerald or the like is secured to pendent body 11 in the manner set forth below in FIG. 6.

In its preferred form, pendent body 11, hinge 18 and jewel cover 16 are fabricated of a single integral molded plastic member fabricated of a plastic material known as a shape memory plastic. In particular, it has been found advantageous to fabricate the pendent body hinge and jewel cover of a shape memory plastic which is a vinyl compound. The essential characteristic of the material used to form pendent body 11, hinge 18 and jewel cover 16 is the so-called shape memory property. In this property which is known the art, the plastic material tends to return to a predetermined shape configuration when the material is thermally relaxed or warmed. The material is, however, temporarily deformable by subjection of the material to a lowered temperature while the material is held in a deformed condition. Thus, in the embodiment of the present invention shown in FIG. 1, jewel cover 16 and hinge 18 have assumed their relaxed or normal position and thus jewel cover 16 is pivoted from jewel 12 at hinge 18 and maintained in an open configuration.

Figure 2:
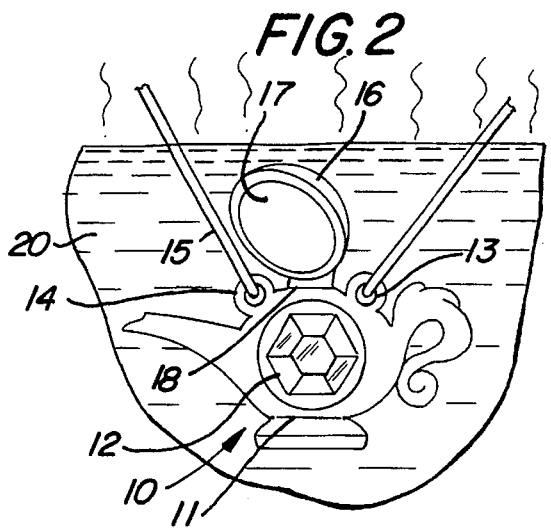
FIG. 2 sets forth a front view of the present invention toy jewel ornament immersed in a warm water bath.
Figure 3:
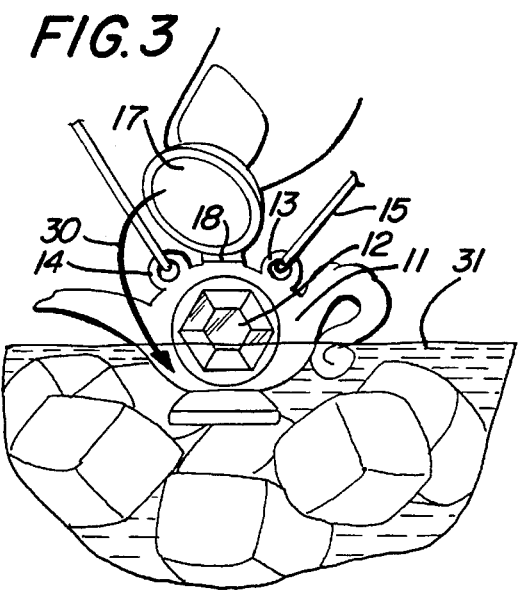
FIG. 3 sets forth a front view of a toy jewel ornament constructed in accordance with the present invention being configured to its closed position in a cold water bath.
Figure 4:
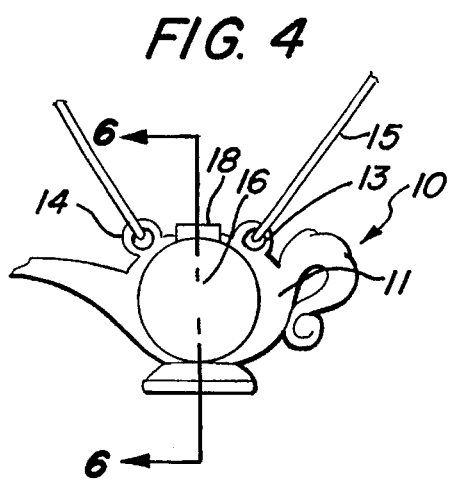
FIG. 4 sets forth a front view of the present invention toy jewel ornament in its closed position.
Figure 5:
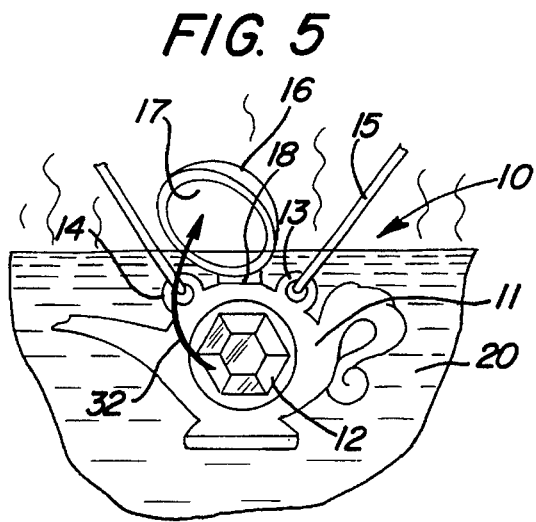
FIG. 5 sets forth a front view of the present invention toy jewel ornament during its thermally responsive opening function.

FIGS. 2, 3, 4 and 5 set forth the sequential cycling of jewel ornament 10 from the open configuration shown in FIG. 1 to the closed configuration shown in FIG. 4 and thereafter returning to the open configuration shown in FIG. 5.

More specifically, FIG. 2 sets forth a toy jewel ornament 10 immersed in a warm water bath 20. Thus, as described above, ornament 10 includes a body 11, a jewel cover 16 having a cavity 17 formed therein and a hinge 18 fabricated of a single integral molded plastic unit. A jewel 12 is secured to body 11 and a cord 15 is received within eyelets 13 and 14 to facilitate wearing of ornament 10 in a pendent-like fashion. In the initial step of cycling ornament 10 shown in FIG. 2, ornament 10 is immersed in a warm water bath 20 for a sufficient time to warm the shape memory plastic material of body 11 and facilitate the transfer of ornament 10 to the closed position. Once ornament 10 is sufficiently warmed within warm water bath 20, ornament 10 is removed from warm water bath 20 and the user then closes jewel cover 16 upon body 11 pivoting about hinge 18 in the manner shown in FIG. 3.

FIG. 3 sets forth the transfer of ornament 10 from warm water bath of FIG. 2 to a cold water bath 31. Prior to immersion of ornament 10 into cold water bath 31, the user pivots jewel cover 16 about hinge 18 in the direction indicated by arrow 30 causing jewel cover 16 to assume its closed position upon body 11 and enclosing jewel 12 within cavity 17 of cover 16. Once cover 16 is fully closed, the user then immerses ornament 10 into cold water bath 31 while maintaining the closure of jewel cover 16. The function of cold water bath 31 is to thermally set the shape memory material of ornament 10. Following a sufficient time interval to cool and thermally set the shape memory material of ornament 10, ornament 10 will maintain its closed position following withdrawal of ornament 10 from cold water bath 31 for a short period of time.

FIG. 4 sets forth a front view of ornament 10 in the closed configuration following the above-described immersion in a cold water bath for thermal setting. Thus, ornament 10 includes a body 11 having a jewel cover 16 covering the front portion thereof and joined thereto by a hinge 18. Eyelets 13 and 14 are secured by a cord 15. As can be seen in the closed position shown in FIG. 4, cover 16 is maintained upon body 11 without the need for snap fasteners or locking devices. Rather, the position of cover 16 is maintained by the thermal set imparted to hinge 18. This configuration of ornament 10 will be maintained with a slight opening action until ornament 10 is again subjected to a warm water bath or otherwise warmed whereupon hinge 18 returns due to its shape memory properties to the open configuration of FIG. 1.

FIG. 5 sets forth the completion of the operational cycle of ornament 10 in that ornament 10 is again immersed in a warm water bath 20. The warming of ornament 10 and particularly hinge 18 relaxes the thermal set previously given to ornament 10 in the cold water bath of FIG. 3. As a result, the shape memory properties of hinge 18 pivot jewel cover 16 upwardly in the direction indicated by arrow 32 to return ornament 10 to the open configuration and expose jewel 12.

Figure 6:
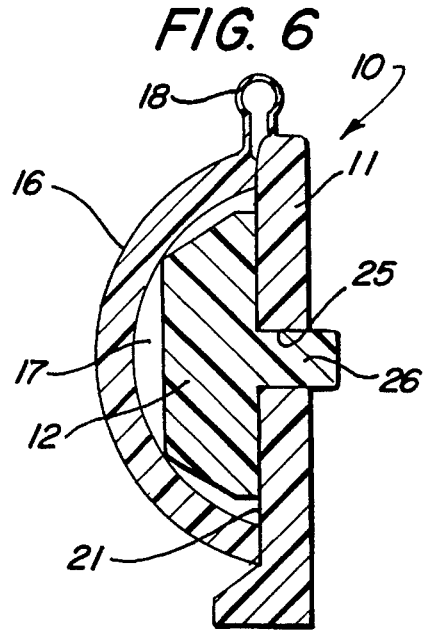
FIG. 6 sets forth a section view of the present invention toy jewel ornament taken along section lines 6—6 in FIG. 4.

FIG. 6 sets forth a section view of ornament 10 taken along section lines 6—6 in FIG. 4. As described above, ornament 10 includes a body 11, a jewel cover 16 and a hinge 18 fabricated of a single molded plastic member. As is also described above, body 11, cover 16 and hinge 18 are preferably fabricated of a shape memory plastic material. Of particular importance in the present invention is the fabrication of hinge 18 of a shape memory plastic material. In addition, body 11 defines an aperture 25 and a front face 21. Jewel cover 16 defines an interior cavity 17 and, in the closed position shown in FIG. 6, is received upon front surface 21. A toy jewel 12 fabricated of a simulated jewel-like material such as clear or transparent colored plastic or the like is formed to replicate a faceted jewel and includes a post 26 which extends through aperture 25 to secure jewel 12 upon front face 21. Post 26 may be secured within aperture 25 using conventional fabrication techniques such as sonic or chemical welding or conventional adhesive attachment.

In the anticipated use of toy jewel ornament 10, cord 15 is utilized to secure ornament 10 to a toy figure body in a pendent-like fashion with jewel cover 16 positioned in the closed position shown in FIG. 4 using the above-described procedure. Thereafter, as part of the anticipated play pattern, the toy figure together with ornament 10 or the ornament alone are immersed in a warm water bath or otherwise subject to sufficient warmth to cause jewel cover 16 to spring open exposing the jewel in an amusing and entertaining play pattern. While the present invention toy jewel ornament is anticipated to be sized appropriately for wearing upon a toy figure, it will be understood by those skilled in the art that it may be fabricated in a somewhat larger fashion to facilitate wearing by a child user.

FIG. 7 sets forth a perspective assembly view of an alternate embodiment of the present invention toy jewel ornament generally referenced by numeral 40. Ornament 40 includes a molded plastic flower having a center base portion 41 and a plurality of radially extending petals 42, 43, 44, 45 and 46. Base portion 41 defines a center aperture (not shown). Ornament 40 further includes a simulated toy jewel 50 having a multifaceted appearance and including a downwardly extending cylindrical attachment post 51. Post 51 extends through the aperture formed in base portion 41 allowing jewel 50 to rest in a generally centered position upon base portion 41. A toy figure arm 60 constructed in accordance with conventional fabrication techniques further includes an aperture 61 formed therein. Aperture 61 receives post 51 to provide a secure attachment for ornament 40 to the wrist of arm 60. The attachment between post 51 and arm 60 may, for example, utilize conventional fabrication techniques such as adhesive bonding, thermal or chemical welding, or simply a tight interference fit between post 51 and aperture 41.

In accordance with the description of the embodiment set forth above in FIGS. 1 through 6, ornament 40 is similarly formed of a thermoplastic or shape memory plastic material which in its relaxed state shown in FIG. 7 allows petals 42 through 46 to curve outwardly and upwardly while extending away from base portion 41 thereby exposing jewel 50. Thus, in the relaxed position shown, ornament 40 resembles an open flower having a jewel at its center.

FIGS. 8, 9, 10 and 11 set forth the sequential stages in the cycling of ornament 40 through its open and closed positions. Thus, as depicted in FIGS. 8 and 9, ornament 40 is configured to the closed position which is shown in FIG. 10 and thereafter ornament 40 is returned to the open position as seen in FIG. 11.

More specifically, FIG. 8 sets forth warm water bath 20 having arm 60 and ornament 40 immersed therein. As described above, the warming of the plastic material of ornament 40 is the initial step in configuring the ornament in its alternate closed position. Thus, arm 60 as well as ornament 40 are immersed within warm water bath 20 for a sufficient time to relax and warm the shape memory material from which petals 42 through 46 and base portion 41 are formed.

FIG. 9 sets forth a perspective view of the next stage in cycling ornament 40 in which ornament 40 is closed by the user as the user presses petals 42 through 46 upwardly and together forming a closed configuration in which petals 42 through 46 generally converge and enclose jewel 50. With petals 42 through 46 maintained in a closed position, arm 60 and ornament 40 are immersed in cold water bath 31 and maintained therein for a sufficient time to allow the shape memory plastic of ornament 40 to acquire a thermal set. Once ornament 40 has acquired a thermal set, the user may release ornament 40 and remove arm 60 of the toy figure from cold water bath 31.

FIG. 10 sets forth a perspective view of ornament 40 in the closed position following the above-described manipulation and cold water bath. As can be seen, ornament 40 is maintained upon arm 60 at base portion 41 and petals 42 through 46 extend upwardly and converge inwardly to fully enclose and cover jewel 50 (seen in FIG. 9). Ornament 40 therefore assumes a "bud-like" appearance corresponding to a flower which is supported upon arm 60 and which gives no evidence of the enclosed surprise jewel. The user may then utilize the toy figure having arm 60 and ornament 40 thereon in accordance with conventional play patterns. When desired, however, the user may immerse arm 60 and ornament 40 in a warm water bath or otherwise heat ornament 40 to cause ornament 40 to resume the open position and expose the surprise jewel enclosed therein.

FIG. 11 sets forth a perspective view of the operation of ornament 40 as arm 60 and ornament 40 having been previously configured in the closed position of FIG. 10 are thereafter immersed in warm water bath 20. In response to the warming and relaxing of the thermal set imparted to ornament 40 in the previous operations, the heat provided by warm water bath relaxes petals 42 through 46 allowing them to open outwardly exposing jewel 50 upon base 41. The outward opening of petals 42 through 46 resembles a flower blooming while the surprise exposure of gem 50 adds additional interest and excitement to the play pattern for ornament 40.

Once ornament 40 has assumed its open configuration, arm 60 may be withdrawn from warm water bath 20 and the various play patterns of the toy figure may be utilized.

In accordance with an important aspect of the present invention, the exposure of a hidden jewel within the shape memory plastic ornament elements provides a surprise feature which the child user has been found to enjoy. The ornament relies solely upon the shape memory characteristic of the plastic material from which the ornament is formed for its motion and thus does not require the utilization of mechanical parts or apparatus nor does it require a source of energy such as batteries or the like. The ornament is capable of repeated cycling between closed and open positions and enjoys a lengthy useful life due to the shape memory type plastic used to form the ornament.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A jewel ornament toy comprising:

a water-resistant immersible ornament body formed of a shape-memory material having a thermal setting characteristic which holds a shape when warmed then set to shape and thereafter cooled while held defining an open position and a closed position; and a toy jewel supported upon said ornament body, said jewel being exposed in said open position of said ornament body and hidden in said closed position of said ornament body, said ornament body assuming said open position when warmed and being reconfigurable by setting and cooling to said closed position when forced to said closed position and cooled while being forced in said closed position to acquire a thermal set and said body returning to said open position thereafter when warmed.

2. A jewel ornament toy as set forth in claim 1 wherein said ornament body includes at least one hingedly coupled member movable to provide said open and closed positions.

3. A jewel ornament toy as set forth in claim 2 wherein said ornament body and said at least one hingedly coupled member are formed of an integral molded plastic part.

4. A jewel ornament toy as set forth in claim 3 wherein said ornament body includes a center base portion and wherein said at least one hingedly coupled member includes a plurality of petals extending generally radially from said base in said open position and curving upwardly and converging in said closed position.

5. A jewel ornament toy as set forth in claim 4 further including means for attaching said ornament to a toy figure.

6. A jewel ornament toy as set forth in claim 3 wherein said at least one hingedly coupled member includes a jewel cover having a generally hemispherical shape.

7. A jewel ornament toy as set forth in claim 6 wherein said ornament body defines an appearance generally resembling an Aladdin's lamp.

8. A jewel ornament toy as set forth in claim 6 wherein said ornament body includes a cord attachment for wearing said ornament as a pendent.

9. A play method for a jewel ornament toy, said method comprising the steps of:

providing a jewel ornament toy having a one-piece integrally formed ornament body and a toy jewel supported thereon, said body being formed of a thermal set material configurable in an open position exposing said jewel and a closed position hiding said jewel;

providing a bath of warm water bath and a cool water bath;

warming said jewel ornament toy by immersing it into said warm water bath to cause said ornament body to assume said open position;

manually forcing said warmed ornament body to said closed position;

cooling said jewel ornament toy by immersing it into said cool water bath while continuing to maintain said ornament body in said closed position until said ornament body is thermally set in said closed position;

releasing said ornament body after cooling; and rewarming said jewel ornament toy by again immersing it into said warm water bath to cause said thermally set ornament body to return to said open position.

\* \* \* \* \*